H. H. Lorr,
Sawing Shingles.
N° 19,644.   Patented Mar. 16, 1858.
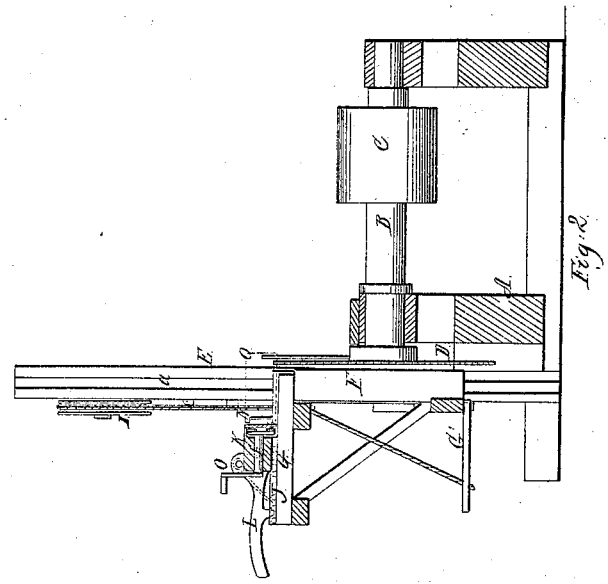
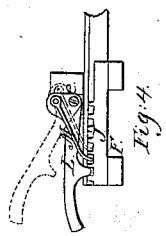
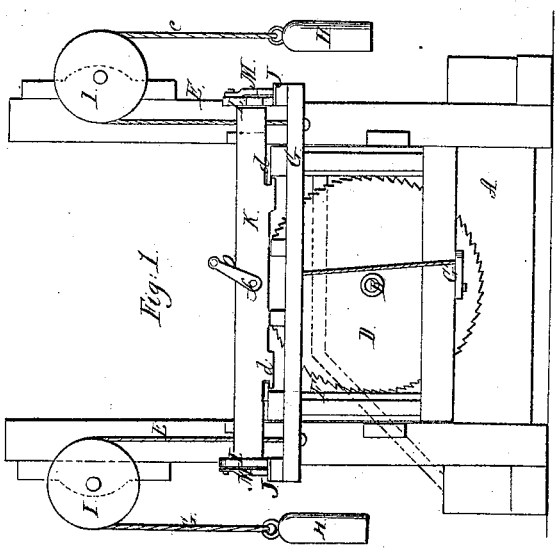
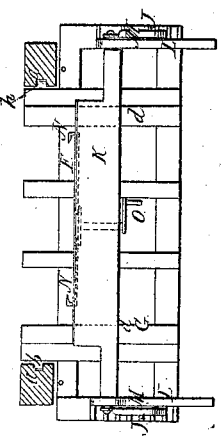

UNITED STATES PATENT OFFICE.

H. H. LOW, OF GALENA, ILLINOIS.

SAWING-MACHINE.

Specification forming part of Letters Patent No. 19,644, dated March 16, 1858; Reissued March 6, 1866, No. 2,184.

*To all whom it may concern:*

Be it known that I, H. H. Low, of Galena, in the county of Jo Daviess and State of Illinois, have invented a new and Improved Sawing-Machine; and I do hereby declare that the following is a full, clear, and exact description of the same, reference being had to the annexed drawing, making a part of this specification, in which—

Figure 1, is a front view of my improvement. Fig. 2, is a transverse vertical and central section of ditto. Fig. 3, is a detached plan or top view of the bolt table. Fig. 4, is a detached end view of the bolt table.

Similar letters of reference indicate corresponding parts in the several figures.

This invention consists in the employment or use of a vertical sliding and balanced bolt frame, circular saw, and feeding device combined and arranged to operate as hereinafter shown and described, for the purpose of sawing shingles, barrel head stuff and similar articles.

To enable those skilled in the art to fully understand and construct my invention I will proceed to describe it.

A, represents a framing which may be constructed in any proper way, and B, represents an arbor or shaft which is placed horizontally on said frame. On the arbor B, a pulley C, is placed and a circular saw D, is attached to one end.

To the end of the framing A, and nearly in the same plane with the saw D, there are attached two uprights E, E, are at each side of the framing A, as shown in Fig. 1. These uprights are grooved vertically at their inner sides as shown at (*a*) and a frame or gate F, is fitted between the uprights, the gate having projections (*b*) at its ends which fit in the grooves. The gate F, is allowed to slide freely up and down between the uprights. To the upper part of the gate F, a horizontal frame G is attached. The gate and frame are counterbalanced by weights H, which are attached to cords or chains (*c*) that pass over pulleys I, I, secured to the upper parts of the uprights E, E, the cords being attached to the gate F. To the lower part of gate F, a treadle G', is attached.

J, J, are two racks which are secured to the upper surface of the frame G, one at each end, and K, is a bar which is placed longitudinally on the frame G, and fitted and allowed to slide between guides or ways (*d*) (*d*) on the frame as shown clearly in Fig. 1. To each end of the bar K, a lever L, is pivoted and to each lever near its pivot (*e*) a pawl M, is attached, said pawls catching into the racks J, J, as shown in Figs. 1, 3 and 4.

To the inner side of the bar K, two dogs N, N, are attached. These dogs are connected to a shaft (*f*) which passes transversely through the bar K, and has a lever O, attached to its outer end.

The operation is as follows:—The bolt shown in red Fig. 2 and designated by O, is secured to the bar K, by the dogs N, N, and the weights H, H, are sufficiently heavy to keep the frame G, elevated and the bolt O, above the saw when the foot of the operator is not on the treadle. The operator by depressing the treadle G', with his foot forces down the gate F, and frame G, and the bolt O, is thereby fed down to the saw D, which is rotated by means of a band passing around pulley C, when the saw has made its cut the operator removes his foot from the treadle and the weights H, H, raise the frame G, the bolt O, being raised above the saw. When the frame reaches its highest point the bolt O is adjusted by operating the levers L, L, either one or both of them. If both levers are operated the bar K, and bolt O, will be moved bodily toward the saw and the stuff will be sawed from the bolt with parallel sides. In case shingles or other stuff having taper sides are to be sawed each lever is operated or moved alternately as the bolt ascends and the bolt will therefore be presented obliquely to the saw and alternately in opposite positions so that the stuff will be cut in taper form the butts and thin ends being cut alternately from both ends of the bolt.

From the above description it will be seen that the bolt frame G, may be so arranged as to pass below the saw, the bolt being fed upward to the saw instead of downward, the effect however would be the same in either case.

This machine is simple and may be cheaply constructed. The bolt may be adjusted with great facility so that less time than usual is expended in gigging back and adjusting the bolt previous to its being fed to the saw.

I do not claim separately any of the parts herein described, but,

Having thus described my invention, what I claim as new and desire to secure by Letters Patent, is,

The vertically sliding and balanced bolt gate G, and saw D, in combination with the feeding device formed of the bar K, levers L, pawls M, and racks J, the whole being arranged to operate conjointly as and for the purpose herein set forth.

H. H. LOW.

Witnesses:
MARVEL DARST,
WM. W. VENABLE.

[FIRST PRINTED 1912.]